(12) United States Patent
Larson et al.

(10) Patent No.: US 6,505,263 B1
(45) Date of Patent: Jan. 7, 2003

(54) BUS CONTROLLER OPERATING CODE IN SYSTEM MEMORY

(75) Inventors: Mark A. Larson, Austin, TX (US); Benjamen G. Tyner, Austin, TX (US); Peter A. Woytovech, Austin, TX (US)

(73) Assignee: Dell U.S.A. L.P., Round Rock, TX (US)

( * ) Notice: Subject to any disclaimer, the term of this patent is extended or adjusted under 35 U.S.C. 154(b) by 0 days.

(21) Appl. No.: 09/491,576

(22) Filed: Jan. 25, 2000

(51) Int. Cl.$^7$ .............................................. G06F 13/00
(52) U.S. Cl. ...................... 710/100; 710/100; 710/107; 710/305; 710/53; 711/103; 711/105; 711/153
(58) Field of Search ...................... 710/305, 53, 107, 710/100; 711/153, 103, 105; 257/296, 298

(56) References Cited

U.S. PATENT DOCUMENTS

| | | | |
|---|---|---|---|
| 4,868,738 A | 9/1989 | Kish et al. ................... | 364/200 |
| 5,163,145 A | 11/1992 | Parks ......................... | 395/500 |
| 5,241,643 A | 8/1993 | Durkin et al. .............. | 395/425 |
| 5,261,068 A | 11/1993 | Gaskins et al. ............. | 395/425 |
| 5,638,527 A | 6/1997 | Parks et al. ................. | 395/412 |
| 5,774,744 A | 6/1998 | Story et al. ................. | 395/847 |
| 5,845,151 A | 12/1998 | Story et al. ................. | 395/847 |
| 5,859,993 A | 1/1999 | Snyder ........................ | 395/384 |
| 5,867,642 A | 2/1999 | Vivio et al. ............ | 395/182.06 |
| 5,896,534 A | 4/1999 | Pearce et al. ................ | 395/680 |
| 5,901,293 A * | 5/1999 | Claxton ...................... | 710/107 |
| 5,933,852 A * | 8/1999 | Jeddeloh ..................... | 711/53 |
| 5,958,020 A | 9/1999 | Evoy et al. .................... | 710/3 |
| 5,974,486 A | 10/1999 | Siddappa ..................... | 710/53 |
| 5,987,530 A | 11/1999 | Thomson ........................ | 710/4 |
| 6,209,042 B1 * | 3/2001 | Yanagisawa et al. .......... | 710/3 |
| 6,222,216 B1 * | 4/2001 | Rao et al. .................... | 257/296 |
| 6,233,640 B1 * | 5/2001 | Luke et al. ................. | 710/305 |

OTHER PUBLICATIONS

Scott Mueller; "Upgrading and Repairing PCs"; Indianapolis, Ind. Chapter 6, pp. 346–412 (1999).*
Michael Longwell, Keith Matteson, and Terry Parks; *A Digital Computer Having a System for Sequentially Refreshing an Expandable Dynamic RAM Memory Circuit*; U.S. Ser. No.: 08/058,822; Filed May 7, 1993. (Copy Not Enclosed).
Richard Chan and Joe Vivio; *System and Method To Coherently And Dynamically Remap An At–Risk Memory Area by Simultaneously Writing Two Memory Areas*; U.S. Ser. No.: 08/512,691; Filed Aug. 10, 1995. (Copy Not Enclosed).
Shaojie, Li, George Mathew, and Frank Wu; *Systems And Methods For Providing Selectable Initialization Sequences*; U.S. Ser. No.: 09/457,016; Filed Dec. 8, 1999. (Copy Not Enclosed).
Universal Serial Bus Specification: Revision 1.1; Sep. 23, 1998; 311 pages.

* cited by examiner

Primary Examiner—Peter Wong
Assistant Examiner—Benjamin Ortiz
(74) Attorney, Agent, or Firm—Baker Botts L.L.P.

(57) ABSTRACT

A computer system having bus controller operating code stored in a non operating system managed, extended portion of system memory. In one example, the operating code is executed by a bus controller for a computer bus conforming to the Universal Serial Bus (USB) specification. In one example, the bus controller operating code is stored in a portion of system memory that is located above the top system memory address reported to the operating system, thereby hiding the stored code from the operating system. In one example, the bus controller operating code is constructed during the startup of the computer system with a code construction routine. Storing bus controller operating code in a non operating system managed, extended portion of system memory provides a computer system greater flexibility in system memory usage.

29 Claims, 11 Drawing Sheets

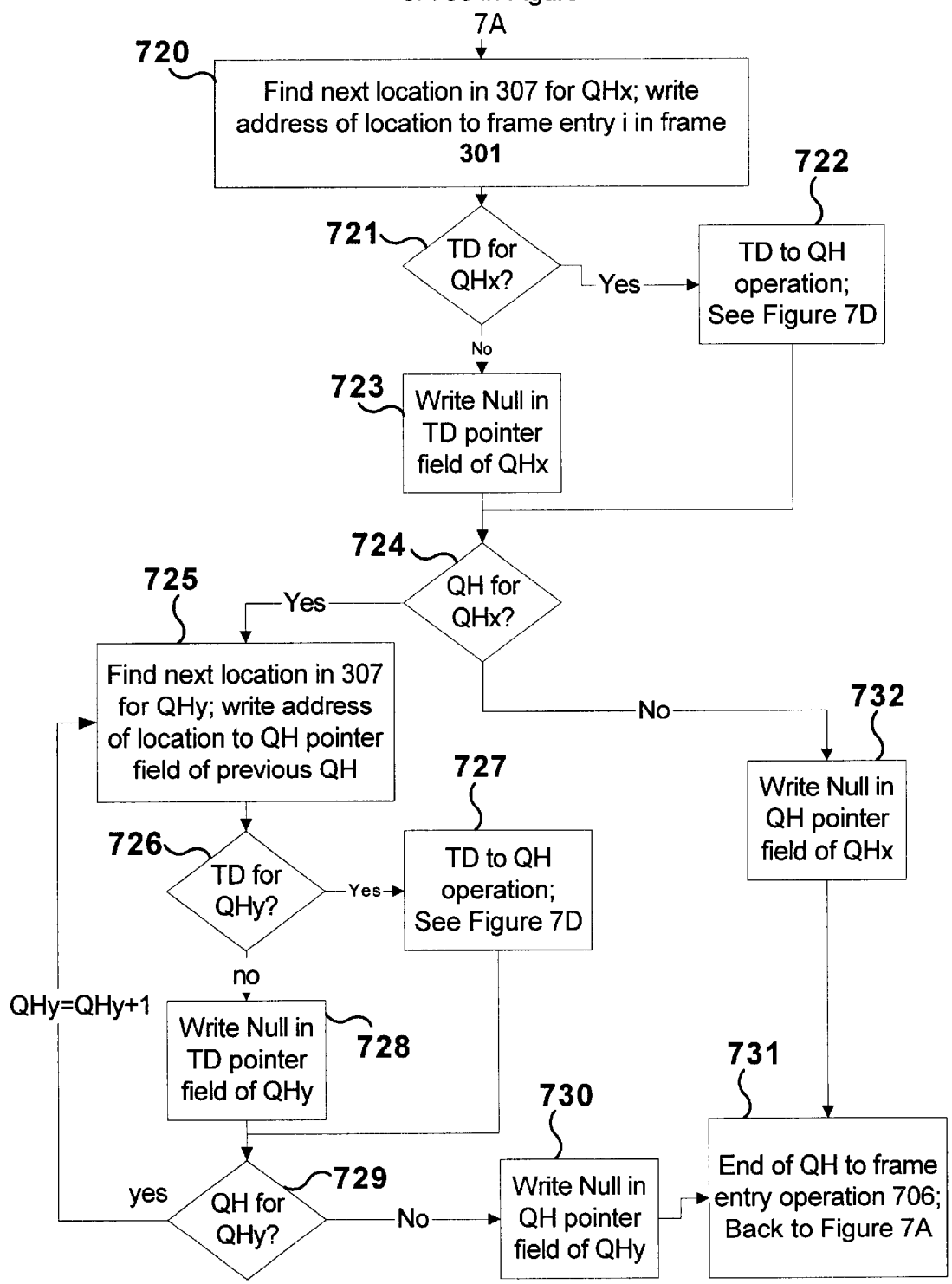

BUS CONTROLLER OPERATING CODE IN SYSTEM MEMORY

BACKGROUND OF THE INVENTION

1. Field of the Invention

This invention relates in general to computer systems and in particular to operating code storage in system memory for a computer bus controller.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Computer systems utilize computer buses for operably coupling peripheral devices to the system processor. An example of a such a computer bus is a computer bus conforming to the Universal Serial Bus (USB) Specification, Rev. 1.1, Sep. 23, 1998, which hereby incorporated by reference in its entirety. Some computer busses include a bus controller for enabling the operations of the computer bus. Some bus controllers execute operating code in performing their operations. Bus controller operating code may be stored in a separate memory circuit or may be stored in system memory. It has been known to store operating code for a USB bus controller in a real mode memory portion of system memory. One problem with storing bus controller operating code in a real mode memory portion of system memory is it may limit the flexibility of the usage of system memory. Also, storing bus controller operating code in a real mode memory portion of system memory increases the probability of corruption of the operating code by the operating system or other utilities of a computer system.

What is needed is an improved system for storing bus controller operating code.

SUMMARY

In has been discovered that storing operating code for a computer bus controller in a non operating system managed, extended portion of system memory advantageously provides for a better utilization of system memory.

In one aspect, a computer system includes a system processor, a system memory operably coupled to the system processor, a computer bus operably coupled to the system processor, and a computer bus controller for the computer bus. During an operation of the computer system, operating code for the computer bus controller is stored in an extended portion of the system memory that is non operating system managed.

In another aspect, a computer system includes a system processor, a system memory operably coupled to the system processor, a computer bus operably coupled to the system processor, a computer bus controller for the computer bus, and a non volatile memory. The non volatile memory stores code whose execution by the system processor writes operating code for the computer bus controller to an extended portion of the system memory that is non operating system managed.

In another aspect, a method for providing code to a computer bus controller includes writing to a non operating system managed, extended portion of a system memory operating code for a computer bus controller. The method also includes ? executing at least a portion of the operating code by the computer bus controller.

BRIEF DESCRIPTION OF THE DRAWINGS

The present invention may be better understood, and its numerous objects, features, and advantages made apparent to those skilled in the art by referencing the accompanying drawings.

FIGS. 7A–7D show an example of a flow diagram of operations for linking bus controller operating code structures.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
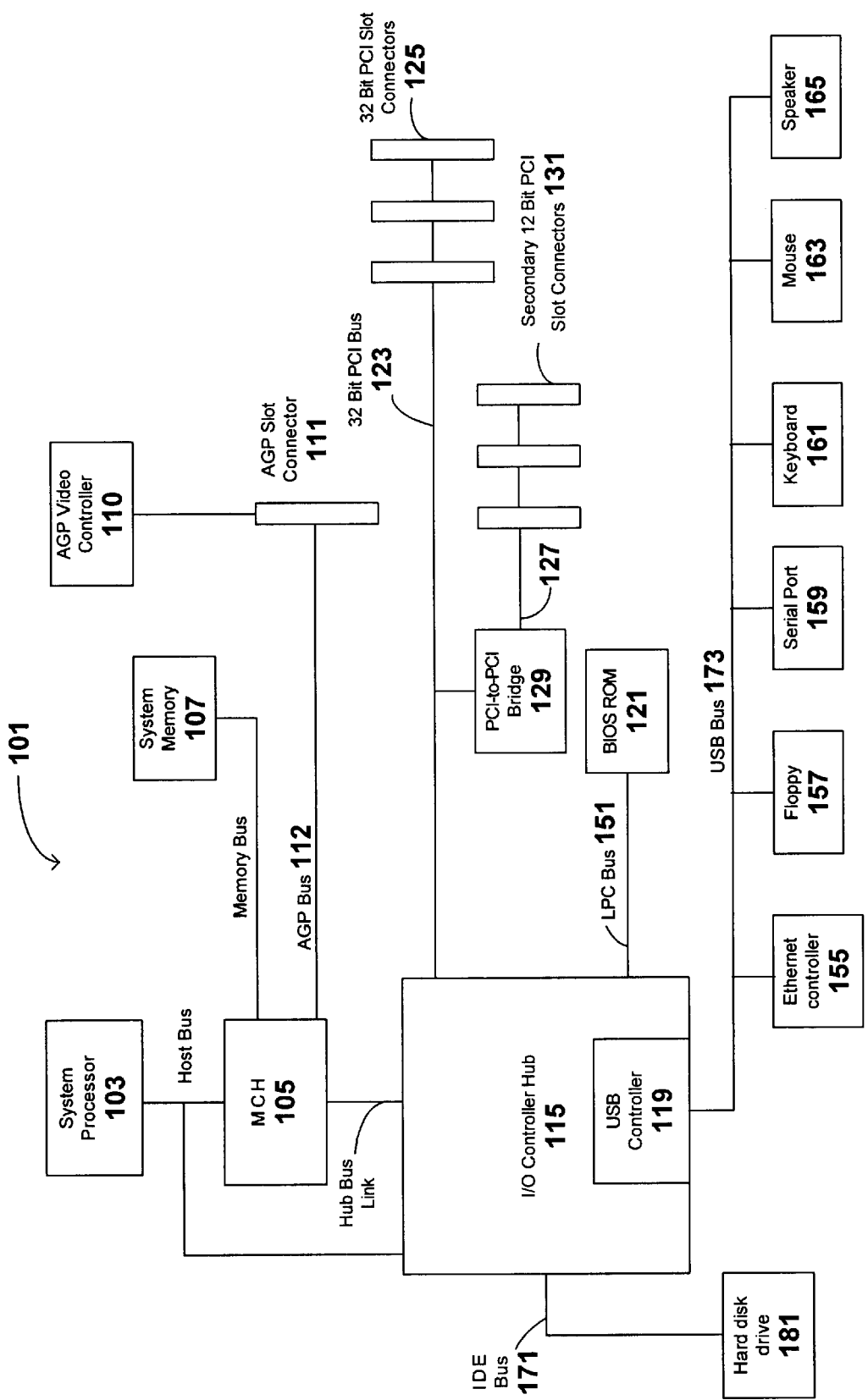
FIG. 1 is a block diagram of an example of a computer system.

FIG. 1 is a block diagram of a computer system. Computer system 101 includes a system processor 103 such as, e.g., a PENTIUM III processor sold by INTEL™. System memory 107 is operably coupled to system processor 103 via a memory controller hub (MCH) 105, which in one embodiment is implemented with a 440BX chipset sold by INTEL™. During the operation of computer system 101, system memory 107 stores code that system processor 103 executes during the operation of computer system 101. A system memory typically includes a plurality of volatile memory circuits such as DRAM or SRAM circuits, however some system memories may include other types of memory circuits.

Computer system 101 also includes a computer bus 173 conforming to the Universal Serial Bus (USB) specification, Rev. 1.1. Located on computer bus 173 are a number of peripheral devices such as ethernet controller 155, floppy disk drive 157, serial port 159, keyboard 161, mouse 163, and speaker 165. Other types of computer devices may also be located on a computer bus conforming to a USB Specification. Computer system 101 also includes a USB controller 119 for enabling access to the devices on USB bus 173.

In one embodiment, USB controller 119 performs a number of functions such as, e.g., state handling, serializer/deserializer functions, frame generation, data processing, protocol engine functions, transmission error handling, remote wakeup, root hub functions, and host system interface. In the embodiment shown, USB controller 119 is implemented in an I/O controller hub 115, which in one embodiment is a PIIX4 chip sold by INTEL™. I/O controller hub 115 is operably coupled to memory controller hub 105 via a hub bus link. In other embodiments, a USB controller is implemented in a separate chip.

USB controller 119 operates asynchronously from system processor 103 in that system processor 103 and USB controller 119 operate independently of each other.

In one embodiment, USB controller 119 executes operating code stored in an extended portion of system memory 107 that is not managed by the operating system of computer system 101. Stored in this portion of system memory is transaction code that USB controller 119 executes to perform USB bus transactions with devices located on USB bus 173.

Figure 2:
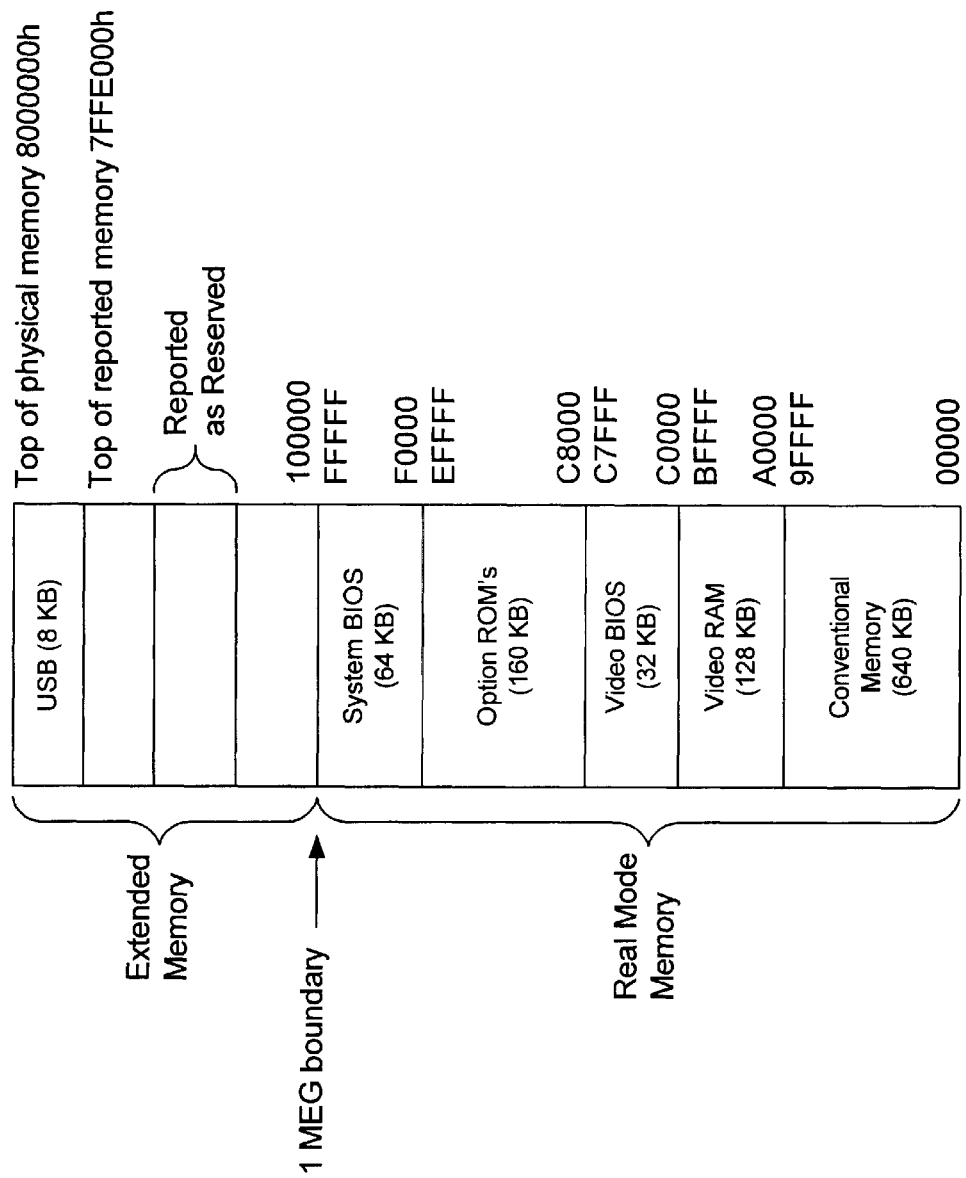
FIG. 2 is an example of a memory map of a system memory of a computer system.

FIG. 2 is an example of a memory map of system memory 107 for computer system 101. For computer systems having a system processor conforming to the X86 architecture, the first 640 K bytes of system memory are typically referred to as conventional memory. The first 1 Megabytes of system memory are typically referred to as real mode memory. Portions of system memory located above the conventional memory in the real mode memory are allocated for video RAM code, video BIOS code, option ROM codes, and shadowed BIOS code. Memory located above the first 1 Megabytes is conventionally referred to as extended memory. Operating system kernel code may be stored in extended memory.

In the memory map of FIG. 2, USB controller operating code is stored in an unreported portion of system memory located above the top reported address, which is 7FFE000h for memory map of FIG. 2. During the startup of a computer system, system processor 103 executes BIOS Power On Startup (POST) code that builds the memory map in system memory 107. When the operating system of computer system 101 is booted up, the operating system performs a BIOS call. In response to the BIOS call, a BIOS routine (implemented by BIOS code executed by system processor 103) reports to the operating system a top address of system memory. To "hide" a portion of system memory from the operating system for USB controller 119, the BIOS routine determines the top address of system memory and reports to the operating system in response to a BIOS call, an address equal to the top determined address minus an amount of system memory reserved for USB controller 119, which in one embodiment is 8 Kbytes. In one example, if a computer system has a system memory of 128 Mbytes and 8 Kbytes of the system memory reserved for USB controller 119, the BIOS routine would report a top address of 7FFE000h. Because the operating system "believes" that the top address of system memory is below the portion of system memory reserved for USB. controller 119, that portion of system memory 107 is hidden from the operating system, and therefore not managed by the operating system.

In some embodiments, a system memory may also include portions that are reported to the operating system during start up but are reported as reserved. Accordingly, these reserved portions are not managed by the operating system. With some embodiments, in response to a BIOS call from the operating system, the BIOS routine reports that portions of system memory are reserved. With some computer systems, the USB controller operating code is stored in these reserved portions of system memory.

Figure 3:
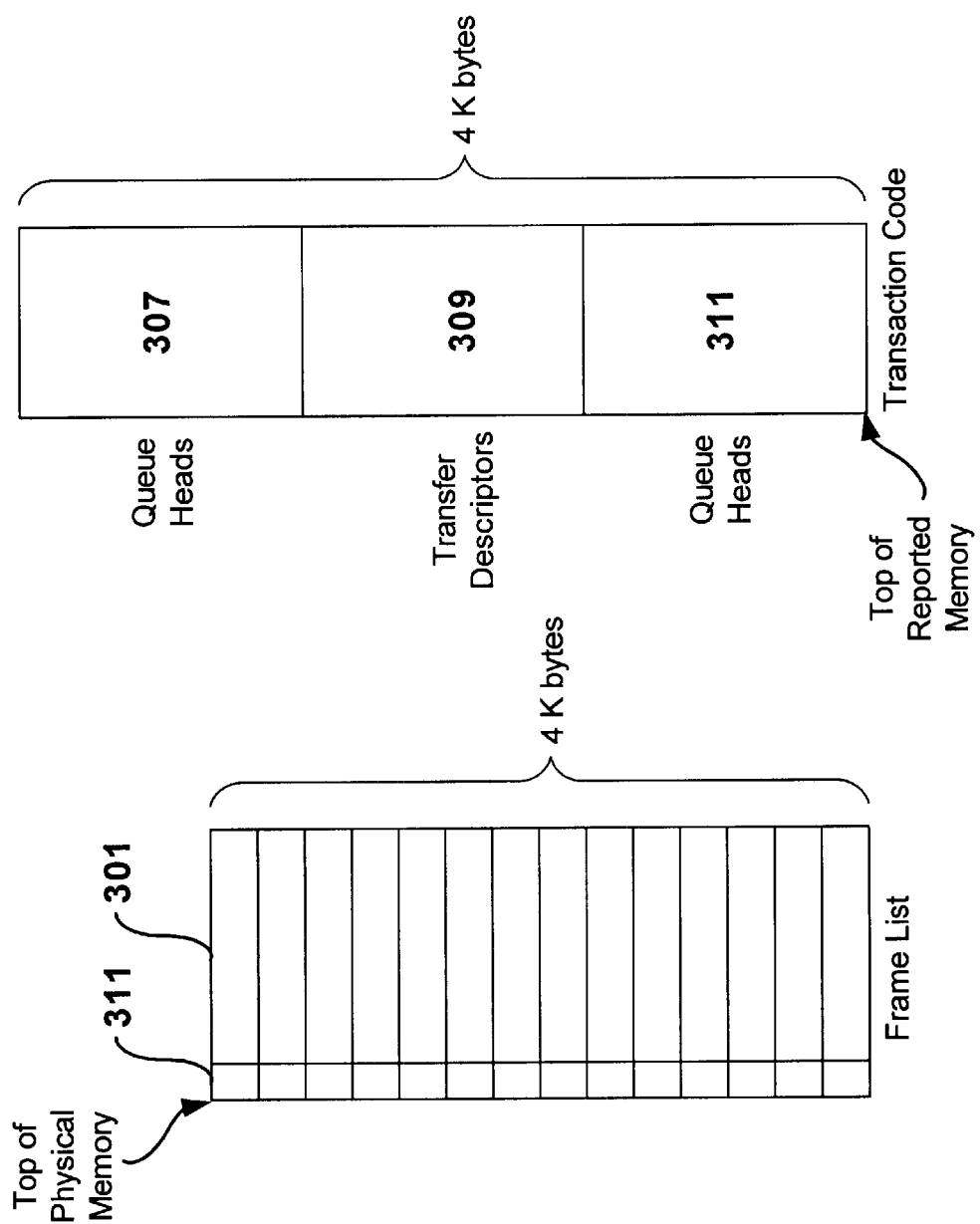
FIG. 3 is an example of a memory map of a portion of system memory reserved for a bus controller.

FIG. 3 is an example of a memory map of a portion of system memory 107 reserved for USB controller 119. In FIG. 3, the portion reserved for USB controller 119 is located between the top physical system memory address and the top reported system memory address. During the operation of computer system 101, operating code for USB controller 119 is stored in the reserved portion. Portion 301 includes a framelist having a plurality of frame entries. In the embodiment shown, portion 301 is located above portion 307. Portion 307 includes a plurality of queuehead code structures. Portion 309 includes a plurality transfer descriptor code structures, and portion 311 includes a plurality of memory buffers. Other types of USB code structures may be stored in the portion of system memory 107 reserved for USB controller 119. In one embodiment, portions 307, 309, and 311 occupy approximately 4 Kbytes of system memory, but may occupy more or less in other embodiments.

In one embodiment, framelist 301 includes 1024 frame entries of 4 bytes each for 4096 bytes of data. Each frame entry includes a pointer that contains either 1) an address of a location in portion 307 of a queuehead code structure linked to the frame entry; 2) an address of a location in portion 309 of a transfer descriptor code structure linked to the frame entry; or 3) a null value indicating that the pointer does not point to a code structure.

Figure 4:
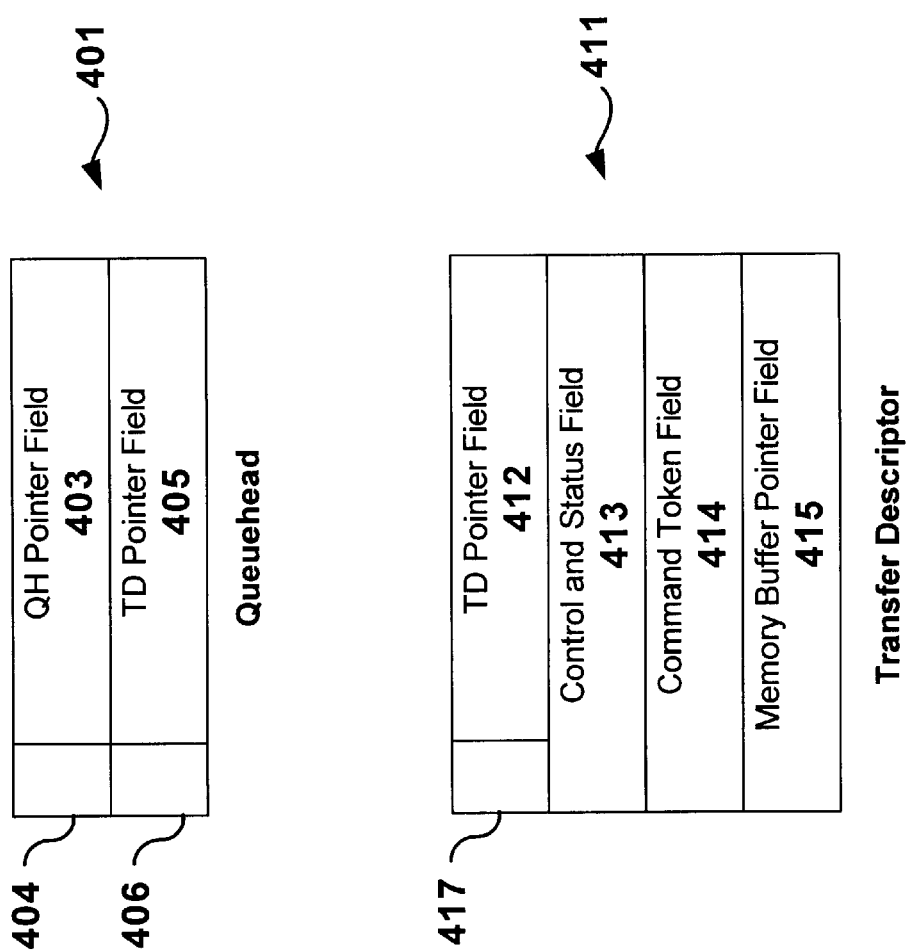
FIG. 4 is shows examples of bus controller operating code structures.

FIG. 4 shows a block diagram of an example of a queuehead code structure 401 and a block diagram of an example of a transfer descriptor code structure 411. Queuehead code structure 401 includes two pointer fields. Queuehead (QH) pointer field 403 is a four byte field which stores an address of a location in portion 307 of another queuehead code structure linked to queuehead code structure 401. Transfer descriptor (TD) pointer field 405 is a four byte field which stores an address of a location in portion 309 of a transfer descriptor code structure linked to queuehead code structure 401.

Transfer descriptor code structure is a 16 byte code structure having a transfer descriptor pointer field 412 for storing an address of a location in portion 309 of another transfer descriptor code structure linked to transfer descriptor code structure 411. Control and status field 413 includes transaction specific information such as the type of device the transaction is directed, interrupt completion information, and error information of the transaction. Command token field 414 includes such information as the type of transaction and the USB bus address of the device that the transaction is directed. Command token field 414 may also include USB command code for the USB commands.

Memory buffer pointer field 415 includes an address of a location in portion 311 of a memory buffer (not shown) linked to transaction descriptor code structure 411. A memory buffer may include from 1 to 1023 bytes of data. A memory buffer may include USB transaction command code for complex USB transactions. A memory buffer may also include data to be provided to a USB device or data received from a USB device. A transfer descriptor code structure may include other fields not shown.

Figure 5:
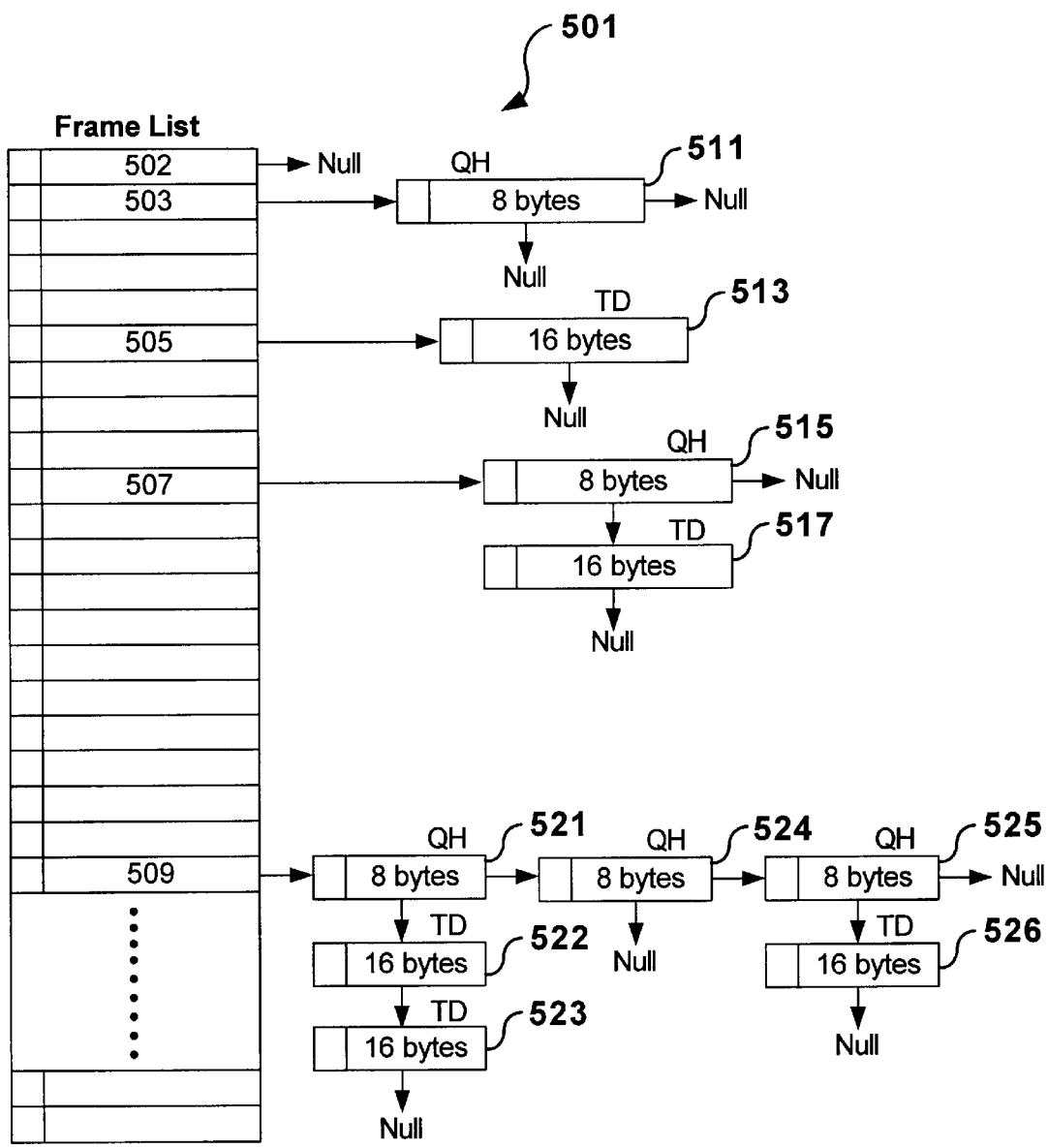
FIG. 5 is an example of a portion of a bus controller transaction schedule.

FIG. 5 is a portion of a bus controller transaction schedule. Each frame entry in framelist 501 includes either 1) a pointer to a queuehead code structure (e.g., the pointer in frame entry 503 points to queuehead code structure 511); 2) a transfer descriptor code structure (e.g., the pointer in frame entry 505 points to transfer descriptor 513); or null value indicating that the frame entry does not point to anything (e.g., the pointer in frame entry 502).

Each queuehead code structure may be linked to another queuehead code structure and/or linked to a transfer descriptor code structure. For example, queuehead code structure 515 is linked to transfer descriptor code structure 517 in that the TD pointer field (e.g., 405) of queuehead code structure 515 contains the address of transfer descriptor code structure 517. A "Null" is shown to the right of an arrow extending from queuehead code structure 515 indicating that the QH pointer field (e.g., 403) of queuehead code structure 515 contains a null value. Queuehead code structure 524 is linked to queuehead code structure 521 in that the QH pointer field (e.g., 403) of queuehead code structure 521 contains the address of queuehead code structure 524. A "Null" is shown below an arrow extending from transfer descriptor code structure 517 indicating that the TD pointer field (e.g., 412) of transfer descriptor code structure 517 contains a null value. Transfer descriptor code structure 523 is linked to transfer descriptor code structure 522 in that the TD pointer field (e.g., 412) of transfer descriptor code structure 522 contains the address of transfer descriptor code structure 523. Each transfer descriptor code structure is linked to a memory buffer (not shown in FIG. 5).

In one embodiment, during the operation of computer system 101, USB controller 119 performs every 1 millisecond, all of the operations (if enabled) that are linked (both directly and indirectly) to a single frame entry. Thus, for a framelist with 1024 frame entries, the operations linked each frame entry are performed once every 1024 milliseconds.

Referring back to FIG. 3, each frame entry includes an active field 311 that contains a value that indicates whether the operations linked to the frame entry are to be performed or not by USB controller 19. In one embodiment, the active field is a bit wide and is referred to as the active bit field. If the active field contains a value of enablement, the code structures linked to the frame entry are executed by USB controller 119. If the active field contains a value of disablement, then the code structures linked to the frame entry are not executed. Consequently, transaction code for USB transactions stored in system memory can be enabled or disabled.

Referring back to FIG. 4, pointer fields 403, 405, and 412 each include "active" fields 404, 406, and 417, respectively for enabling or disabling, the operations that are linked to the pointer fields. For example, referring to FIG. 5, to prevent USB controller 119 from performing the operations of TD code structure 517, the active field (e.g., 406) of the TD pointer field (e.g., 405) of queuehead code structure 515 is written with an value indicating disablement.

In one embodiment, the operating code for USB controller 119 is built in system memory 107 during the startup of computer system 101 by POST BIOS routines. In one embodiment, the code is "preconstructed" and resides in BIOS ROM 121. During the startup of the computer system, POST routines shadow the preconstructed USB controller code to the non operating system managed, extended portion of system memory 107.

In another embodiment, BIOS POST routines (or other routines) include a construct USB code routine (construct code routine) that constructs the USB operating code in system memory 107. Because in some embodiments, the USB code in system memory includes a number of redundant code structures that are the same or are similar with minor modifications, the construct code routine requires significantly less memory space than the USB operating code in system memory (e.g., 8 Kbytes). Consequently, the amount of space in BIOS ROM 121 needed for building the USB operating code in system memory is significantly reduced for systems that construct the USB operating code in system memory during startup.

FIG. 6 sets forth a flow diagram of a routine for constructing USB operating code in system memory (referred to a code construction routine). In one embodiment, the code for this routine in implemented with the BIOS POST code executed by system processor 103 during the startup of the computer system.

In 603, the code construction routine constructs the transaction code structures for the low speed input transactions and links those code structures to the first frame entry of framelist 301. In one embodiment, low speed input transactions are utilized to get data from low speed devices such as keyboard 161 and mouse 163. The transaction code structures of the low speed input transactions are constructed and linked as per the flow diagrams shown in FIGS. 7A–7D.

In one embodiment, the transaction code for collecting data from keyboard 161 is linked to a first queuehead code structure and the transaction code for collecting data from a mouse is linked to a second queuehead code structure linked to the first queuehead code structure. The code construction routine utilizes the same TD code structure template stored in BIOS ROM 121 for all low speed input TD code structures wherein the code construction routine writes a different address to the command token field. (e.g., 414) of the TD code structure for each low speed input device.

In one embodiment, the code construction routine builds a set of low speed input transaction code structures for every possible low speed input device that may be coupled to computer system 101. When computer system 101 determines that a low speed device is coupled to USB bus 173, the new device coupling routines (e.g., the configure HID transactions, see description of 622) write the address of the new device to the appropriate low speed transaction code structures of the set assigned to the device and writes an enable value to the active field (e.g., 406) of TD pointer field (e.g., 405) of a queuehead code structure assigned to the device to enable the code structures linked to the assigned queuehead structure. In another embodiment, the code construction routine preassigns the bus address for the mouse, keyboard, and any other supported low speed input device wherein the new device coupling routines assign the preassigned address to the low speed input device if found on USB bus 173.

In one embodiment, the transaction code for collecting data from a keyboard is linked to a first queuehead code structure and the transaction code for collecting data from a mouse is linked to a second queuehead code structure linked to the first queuehead code structure. In one embodiment, the code construction routine writes an enable value to the active fields (e.g., 404) of the QH pointer field (e.g., 403) of the first queuehead code structure and to the first frame entry of framelist 301. The active fields (e.g., 406) of the TD pointer fields (e.g., 405) of both the first and second queuehead code structures are each written with a disable value by the code construction routine. Thus initially, USB controller 119 will not execute the transaction code for the keyboard or mouse. When the device coupling routines (e.g., configure HID transactions, see 622) determine that a keyboard or mouse is operably coupled to USB bus 173, then the device coupling routines write an enable value to the active field (e.g., 406) of the TD pointer field (e.g., 405) of the queuehead associated with that device.

After the transaction code for all supported low speed devices are constructed, in 605 the code construction routine links the first queuehead of the low speed input transaction code to every eighth frame entry from the first frame entry of framelist 301. Because the transactions linked to each frame entry are performed once every 1024 milliseconds, linking the lowspeed input transaction code to every eighth frame entry allows the transactions to be performed every 128 milliseconds.

In 607, the code construction routine constructs the transaction code structures for the hub status endpoint transactions and links those code structures to the second frame entry of framelist 301. The hub status endpoint transactions, when performed, query each hub on USB bus 173 to determine if the status of the hub has changed such as, e.g., if a new device has been added or removed from the hub. For every hub that can be supported, the code construction routine constructs a queuehead code structure and a set of at least one transfer descriptor code structures (including memory buffers) for accessing a hub and links the set to the queuehead code structure. In one embodiment, computer system 101 can support 8 hubs and accordingly, the code construction routine constructs 8 queuehead code structures and sets of transfer descriptor code structures, all linked to the second frame entry of framelist 301. The code construction routine writes the same TD code structure templates eight times to memory portion 309 and links each of the eight written TD code structures to one of the queuehead code structures. When writing each of the eight TD code structures to memory portion 309, the code construction routine increments the command token field (e.g., 414) of each TD code structure to point to a different hub. The transaction code structures of the hub status endpoint transactions are constructed and linked as per the flow diagrams shown in FIGS. 7A–7D.

The code construction routine writes a disable value to the active field (e.g., 406) of each TD pointer filed (e.g., 405) of each of the eight queuehead code structures associated with a hub. In one embodiment, when a new hub is found and an address to the hub is assigned during the performance of the configure hub transactions (see 618), an SMM handler routine invoked from a system management interrupt (SMI) generated at the completion of the configure hub transactions writes an enable value to the active field (e.g., 406) of the TD pointer field (e.g., 405) of the one of the eight queuehead code structures associated with that hub address to enable the hub status endpoint transactions for that hub. For further examples of USB transactions generating interrupts upon completion, see the application entitled "Background Execution Of Universal Serial Bus Transactions," having listed inventors Mark A. Larson and Benjarnen G. Tyner, having a common assignee, which is being filed concurrently, and which is hereby incorporated by reference in its entirety.

In 608, the code construction routine links the first queuehead of the construct hub status endpoint transactions to every eighth frame entry from the second frame entry of framelist 301.

In 610, the code construction routine constructs the transaction code structures for the get port status transactions and links those code structures to the third frame entry of framelist 301. The get port status transactions, when performed, check the individual ports of each hub to determine if a new device has been added or removed. The get port status transaction code includes a queuehead code structure for every port that may be supported by a hub. For example, in one embodiment where each hub may support up to 8 ports, the get port status transaction code includes eight queuehead code structures each linked to at least one transfer descriptor code structure for determining whether a device has been added to the port or removed from the port. The code construction routine writes TD code structure templates for performing the get port status transactions to eight locations in memory portion 309 and links each of the TD code structures written to one of the eight queuehead structures associated with each port. In writing the eight TD code structures, the code construction routine increments the value written to the command token field (e.g. 413) for each of the TD code structures such that each one accesses a different port. The transaction code structures of the get port status transactions are constructed and linked as per the flow diagrams shown in FIGS. 7A–7D.

In one embodiment, during construction of the get port status transaction code, the code construction routine writes to the active field (e.g., 406) of each TD pointer field (e.g., 405) of each of the eight queuehead code structures associated with each port a value of disablement. Thus initially, USB controller 119 does not execute the get port status transaction code. In one embodiment, an SMM handler invoked from the completion of the hub status endpoint transactions (see 607) writes to the active field (e.g., 406) of each TD pointer field (e.g., 405) of each of the eight queuehead code structures an enable value to turn on the get port status transactions. The SMM handler also writes the hub address in the command token field (e.g., 414) of each of the eight TD code structure(s) (e.g., 411) the hub address of the hub that was determined by the hub status endpoint transactions to have a new device. Thus, eight sets of TD code structures can support all 64 possible ports.

In 612, the code construction routine links the first queuehead of the get port status transactions to every eighth frame entry from the third frame entry such that, when enabled, the get port status transactions are performed every 128 milliseconds until the transaction is complete. In some embodiments, a SMI is generated upon completion of the get port status transactions, wherein the SMM handler disables the get port status transactions by writing a disable value to the turn active field (e.g., 406) of the TD pointer field (e.g., 405) of the eight queuehead code structures.

In 614, the code construction routine constructs the transaction code structures for the get interface descriptor transactions and links those code structures to the fourth frame entry of framelist 301. The get interface descriptor transactions, when performed, query a new device to determine what it is. In one embodiment, the get interface descriptor transactions include at least five IN type transfer descriptor code structures for getting 5 bytes of data from a new device. The code construction routine writes to memory portion 309, a get interface descriptor TD code structure template five times wherein each written TD code structure is linked to the previous TD code structure. The first TD code structure is linked to a queuehead code structure which is linked to the fourth frame entry. The get descriptor code structures are constructed and linked as per the flow diagrams shown in FIGS. 7A–7D.

In one embodiment during construction of the get interface descriptor transaction code, the code construction routine writes to the active field (e.g., 406) of the TD pointer field (e.g., 405) of the queuehead code structure a value of disablement. Thus initially, USB controller 119 does not execute the get interface descriptor transaction code. In one embodiment, an SMM handler invoked from the completion of the reset port transactions (see discussion of 626) writes to the active field (e.g., 406) of the TD pointer field (e.g., 405) of the queuehead code structure an enable value to enable the get interface descriptor transactions. The SMM handler also writes in the command token field (e.g., 414) of each of the five IN TD code structures (e.g., 411) a value indicating whether the new device is a low speed device or a full speed device.

In some embodiments, the code construction routine constructs two sets of get interface descriptor transactions. One set is configured for low speed devices and the second set is configured for full speed devices. Each set would be linked to a separate queuehead code structure, wherein the two queuehead structures would be linked. The SMM handler invoked from the completion of the reset port transactions (see 626) would enable the set needed depending upon whether the new device is a low speed or full speed device. An advantage of constructing two sets is that an SMM handler would only have to write to the active field (e.g., 406) of the TD pointer field (e.g., 405) of the queuehead code structure associated with the desired set of transactions to enable the get interface descriptor transactions. The SMM handler would not have to write to the command token field (e.g., 414) of each of the five TD code structures (e.g., 411) a value indicating whether the new device is a low speed device or a full speed device. However, a disadvantage with this embodiment is that it requires twice as much space in memory portions 307, 309 and 311. Still in other embodiments with two sets of set interface descriptor transactions, each set is linked to a separate frame entry.

In 616, the code construction routine links the first queuehead of the get interface descriptor transactions to every eighth frame entry from the fourth frame entry such that, when enabled, the get interface descriptor transactions are performed every 128 milliseconds until the transaction is complete. In some embodiments, a SMI is generated upon completion of the get interface descriptor transactions, wherein the SMM handler disables the get interface descriptor transactions by writing a disable value to the active field (e.g., 406) of the TD pointer field (e.g., 405) of the first queuehead code structure.

In 618, the code construction routine constructs the transaction code structures for the configure hub transactions and links those code structures to the fifth frame entry of framelist 301. The configure hub transactions, when performed, configures a newly added hub for operation. The configure hub transactions include several separate transactions such as a set address transaction which writes an address to the newly added hub, a set configuration transaction which sets the configuration of the newly added hub, and a turn on power transaction to the port on which the newly added hub is located. Each of these transactions includes at least one TD code structure. All of the TD code structures are linked to a queuehead code structure linked to the fifth frame entry. The configure hub transaction code structures are constructed and linked as per the flow diagrams shown in FIGS. 7A–7D.

In one embodiment during construction of the configure hub transaction code, the code construction routine writes to the active field (e.g., 406) of the TD pointer field (e.g., 405) of the queuehead code structure a value of disablement. Thus initially, USB controller 119 does not execute the configure hub transaction code. An SMM handler invoked from the completion of the get interface descriptor transactions (see 614) writes to the active field (e.g., 406) of the TD pointer field (e.g., 405) of the queuehead code structure an enable value to enable on the configure hub transactions. Prior to writing to the active field (e.g., 406), the SMM handler writes to a memory buffer associated with a set address transfer descriptor code structure the address to be assigned to the hub and writes any other information needed by the configure hub transactions to make operational a hub assigned to the address to which it was added.

In 620, the code construction routine links the first queuehead of the configure hub transactions to every eighth frame entry from the fifth frame entry of framelist 301 such that, when enabled, the set hub transactions are performed every 128 milliseconds until the transaction is complete. In some embodiments, a SMI is generated upon completion of the configure hub transactions, wherein the SMM handler disables the configure hub transactions by writing a disable value to the active field (e.g., 406) of the TD pointer field (e.g., 405) of the first queuehead code structure. The SMM handler also enables the appropriate set of hub status endpoint transactions (see 607) for the address of the newly added hub.

In 622, the code construction routine constructs the transaction code structures for the configure human interface device (HID) transactions and links those code structures to the sixth frame entry of framelist 301. The configure HID transactions, when performed, configures a newly added low speed device or full speed device for operation. The configure HID transactions include several separate transactions such as a set address transaction which writes an address to the newly added device, a set configuration transaction which sets the configuration of the newly added device, and a turn on power transaction to the port on which the newly added device is located. Each of these transactions includes at least one TD code structure. All of the TD code structures are linked to a queuehead code structure linked to the sixth frame entry. The configure HID transaction code structures are constructed and linked as per the flow diagrams shown in FIGS. 7A–7D.

In one embodiment during construction of the configure HID transaction code, the code construction routine writes to the active field (e.g., 406) of the TD pointer field (e.g., 405) of the queuehead code structure a value of disablement. Thus initially, USB controller 119 does not execute the configure HID transaction code. In one embodiment, an SMM handler invoked from the completion of the get interface descriptor transactions (see 614) writes to the active field (e.g., 406) of the TD pointer field (e.g., 405) of the first queuehead code structure an enable value to enable the configure HID transactions. Prior to writing to the active field (e.g., 406), the SMM handler writes to a memory buffer associated with a set address transfer descriptor code structure the address to be assigned to the device and performs writes of any other information needed by the configure HID transactions to make operational a device assigned to the address of the port to which it is added.

In 624, the code construction routine links the first queuehead of the configure HID transactions to every eighth frame entry from the sixth frame entry of framelist 301 such that, when enabled, the set HID transactions are performed every 128 milliseconds until the transactions are complete. In some embodiments, a SMI is generated upon completion of the configure HID transactions, wherein the SMM handler disables the configure HID transactions by writing a disable value to the active field (e.g., 406) of the TD pointer field (e.g., 405) of the first queuehead code structure. The SMM handler also enables the appropriate set of low speed input transactions (see 607) for the address of the newly added low speed device.

In 626, the code construction routine constructs the transaction code structures for the reset port transactions and links those code structures to the seventh frame entry of framelist 301. The reset port transactions, when performed, reset the port of a hub when a device is newly added to that port. The reset port transaction code includes a queuehead code structure for every port that may be supported by a hub. For example, in one embodiment where each hub may support up to 8 ports, the reset port transaction code includes eight queuehead code structures each linked to at least one transfer descriptor code structure (and associated memory buffer) each for resetting a specific port of a hub having a newly added device. The code construction routine writes a TD code structure template(s) for performing the reset port operations to eight locations in memory portion 309 and links each of the written TD code structures to one of the eight queuehead structures associated with each port. In writing the eight TD code structures, the code construction routine increments the value written to the command token field (e.g., 414) for each TD code structure such that each one accesses a different port of a hub. The transaction code structure of the reset port transactions are constructed and linked as per the flow diagrams shown in FIGS. 7A–7D.

In one embodiment during construction of the reset port transaction code, the code construction routine writes to the active field (e.g., 406) of the TD pointer field (e.g., 405) of each of the eight queuehead code structures a value of disablement. Thus initially, USB controller 119 does not execute the configure reset port transaction code. In one embodiment, an SMM handler invoked from the completion of the get port status transactions (see 610) writes to the active field (e.g., 406) of the TD pointer field (e.g., 405) of the queuehead code structure (of the eight queuehead structures) associated with the port of the newly added device an enable value to turn on the reset port transfer descriptors associated with the port of the newly added device. Prior to writing to the active field (e.g., 406), the SMM handler writes to a memory buffer linked to the TD code structure associated with the port of the newly added device the hub address of the port of the newly added device.

In 626, the code construction routine links the first queuehead of the reset port transactions to every eighth frame entry from the seventh frame entry of framelist 301 such that, when enabled, the reset port transactions are performed every 128 milliseconds until the transactions are complete. In some embodiments, a SMI is generated upon completion of the reset port transactions, wherein the SMM handler disables the reset port transactions associated with the port of the newly added device by writing a disable value to the active field (e.g., 406) of the TD pointer field (e.g., 405) of the queuehead code structure associated with the port of the newly added device. The SMM handler also sets the lowspeed/full speed field for the TD code structures of the get identifier descriptor transactions (614) depending upon whether the device is a full speed or a low speed device and enables the get interface descriptor transactions. For those embodiments having two sets of get identifier descriptor transactions, one for low speed devices and one for high speed devices, the SMM handler enables the appropriate set.

In 630, the code construction routine constructs transaction code for miscellaneous transactions. Examples of miscellaneous transactions include Root Hub hot plugging transactions for hot plugging a device at the root hub, LED transaction for turning on or off an LED on keyboard 161, and a typematic transaction for displaying a key that is held down for a period of time. In some embodiments, the code structures for these miscellaneous transactions are linked to the first unused frame entry, which for the embodiment described is the eighth frame entry and every eight frame entry after that. In some embodiments, the miscellaneous transactions are linked to frame entries that are also linked a non miscellaneous transaction. In some embodiments, these transactions are linked to only one frame entry of framelist 301. Accordingly, these transactions are performed only once every 1024 milliseconds.

With some miscellaneous transactions, all of the transfer descriptors for the transaction are stored entirely (or almost entirely) in the BIOS ROM 121 in a linked configuration. With these transactions, the transfer descriptor code structures are copied almost directly from the shadowed BIOS portion of system memory 107. However, other miscellaneous descriptors may include "standard" transaction descriptor code structures that are used with other transactions. For these transactions, the code construction routine would copy those transfer descriptor code structure templates from memory and perform linking and other construction operations on them accordingly.

In one embodiment, after the completion of the code construction routine, the only transaction that is initially enabled is the root hub hot plug transaction. After, the construction of the USB operating code, the root hub hot plug transaction is performed once every 1024 milliseconds to determine whether a device is attached to the root hub. If a device is initially installed on the root hub, an SMM handler invoked by the root hub hot plug transaction causes the enablement of the appropriate transactions that will eventually enable the device input transactions and the hub status endpoint transaction associated with the devices on USB bus 173. Because in some embodiments the enablement of USB transactions is operating system independent due to the use of SMIs and an asyscrhonously operating USB controller 119, such enablement may take place before the operating system is booted up.

Figure 6A:
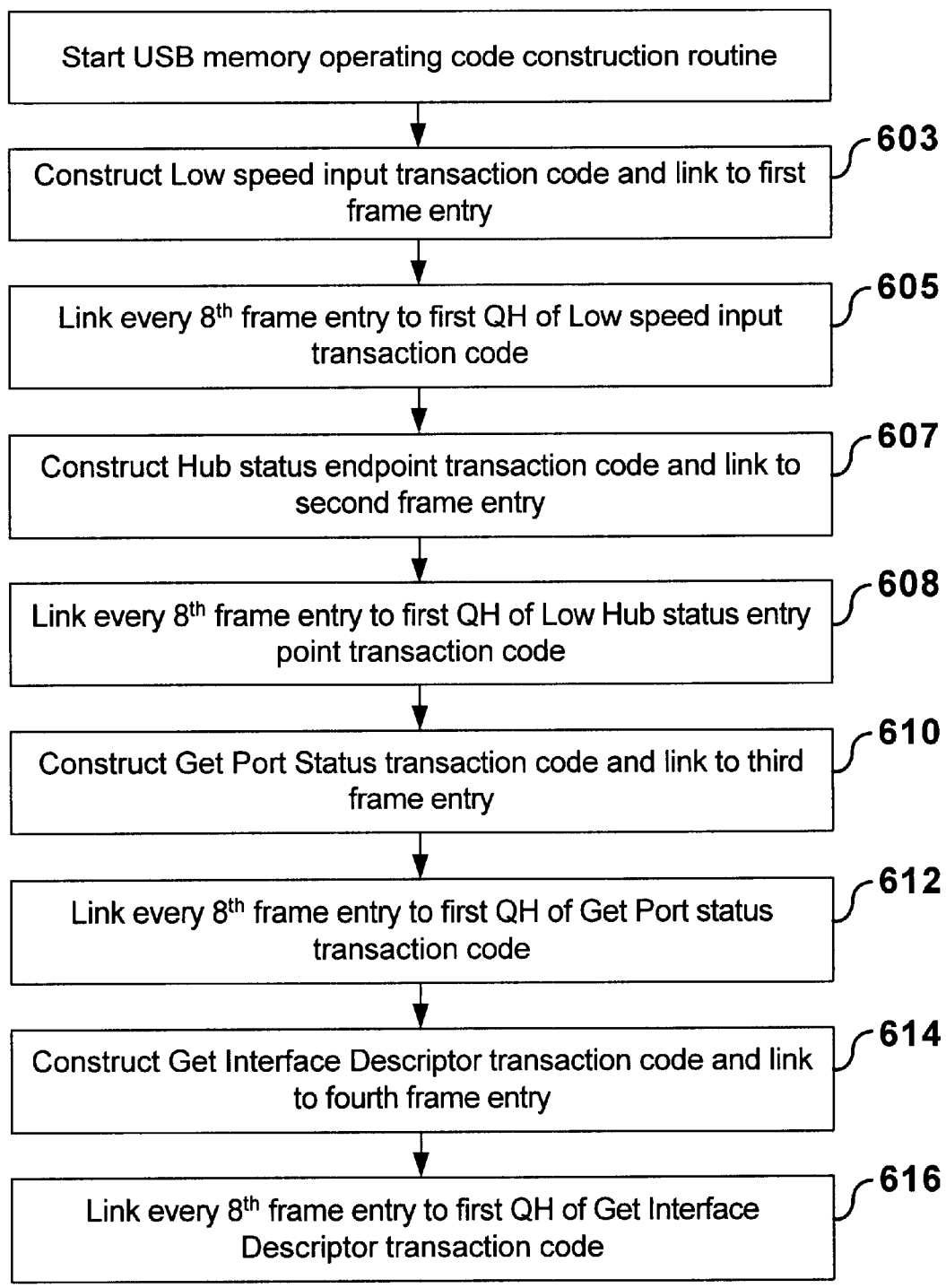
FIGS. 6A–6B show an example of a flow diagram of a routine for building bus controller operating code in a system memory.
Figure 6B:
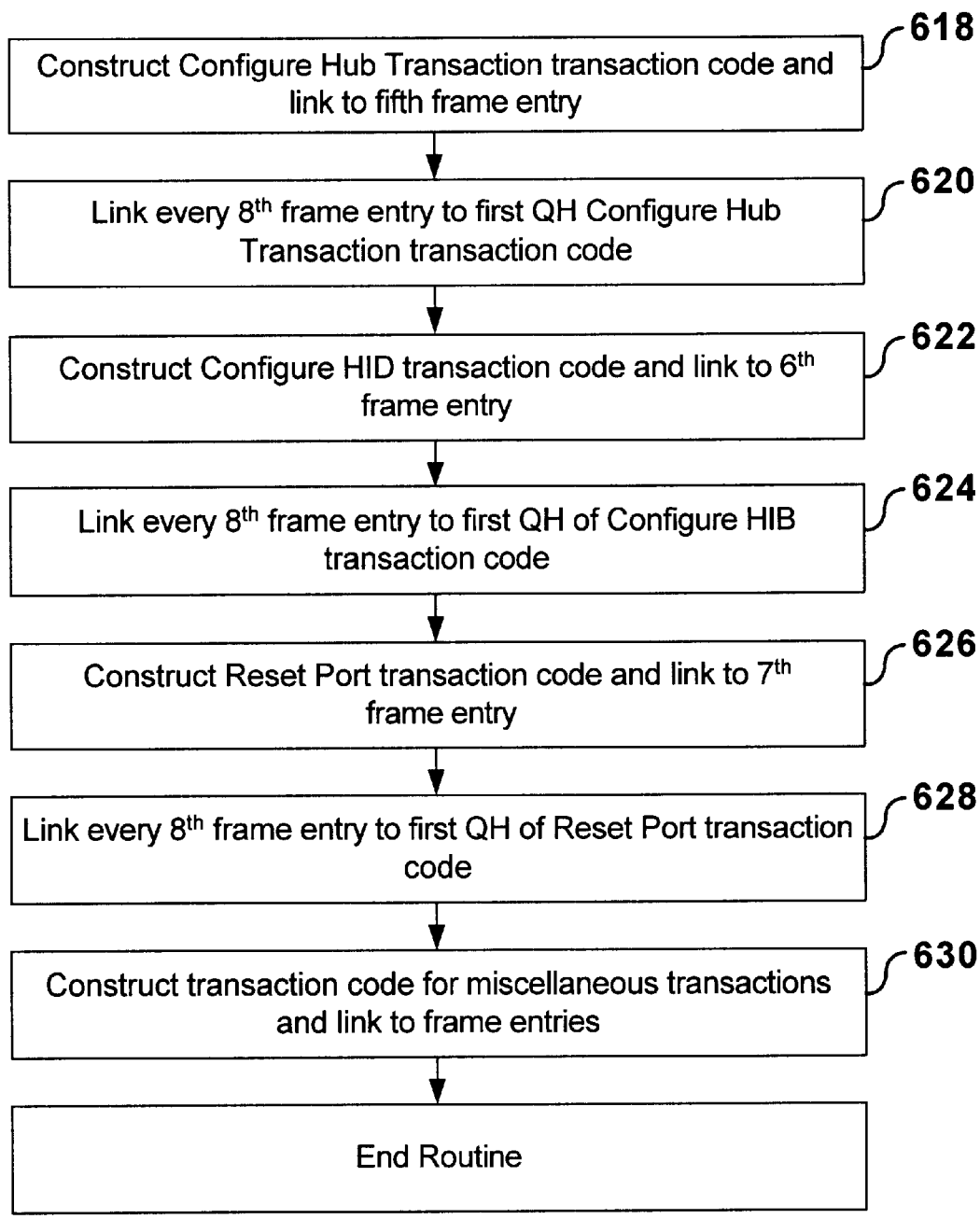

Those of skill in the art will recognize that, based upon the teachings herein, several modifications may be made to the code construction routine operations shown in FIGS. 6A–6B and describe herein. For example, the transaction code for other types of USB transactions may be constructed, such as, e.g., full speed input transactions and transactions for providing data to output devices such as speakers 165 and floppy disk drive 157. Also, the order in which the transaction code for each transaction was constructed may be varied as well. Furthermore, a transaction may be linked to multiple frame entries at different intervals. For example, some (or all) of the transactions may be linked to every 12th frame entry to allow for more repeating transactions to occur.

FIGS. 7A–7D sets forth a flow diagram of operations of the code construction routine for constructing and linking the transaction code structures linked to a frame entry of the framelist 301. The code construction routine performs these operations during the construction of each set of transaction code structures that are linked to a frame entry. For the embodiment of FIG. 6, the operations shown in FIGS. 7A–7D are performed during operations 603, 607, 610, 614, 618, 622, 626, and 630.

Figure 7A:
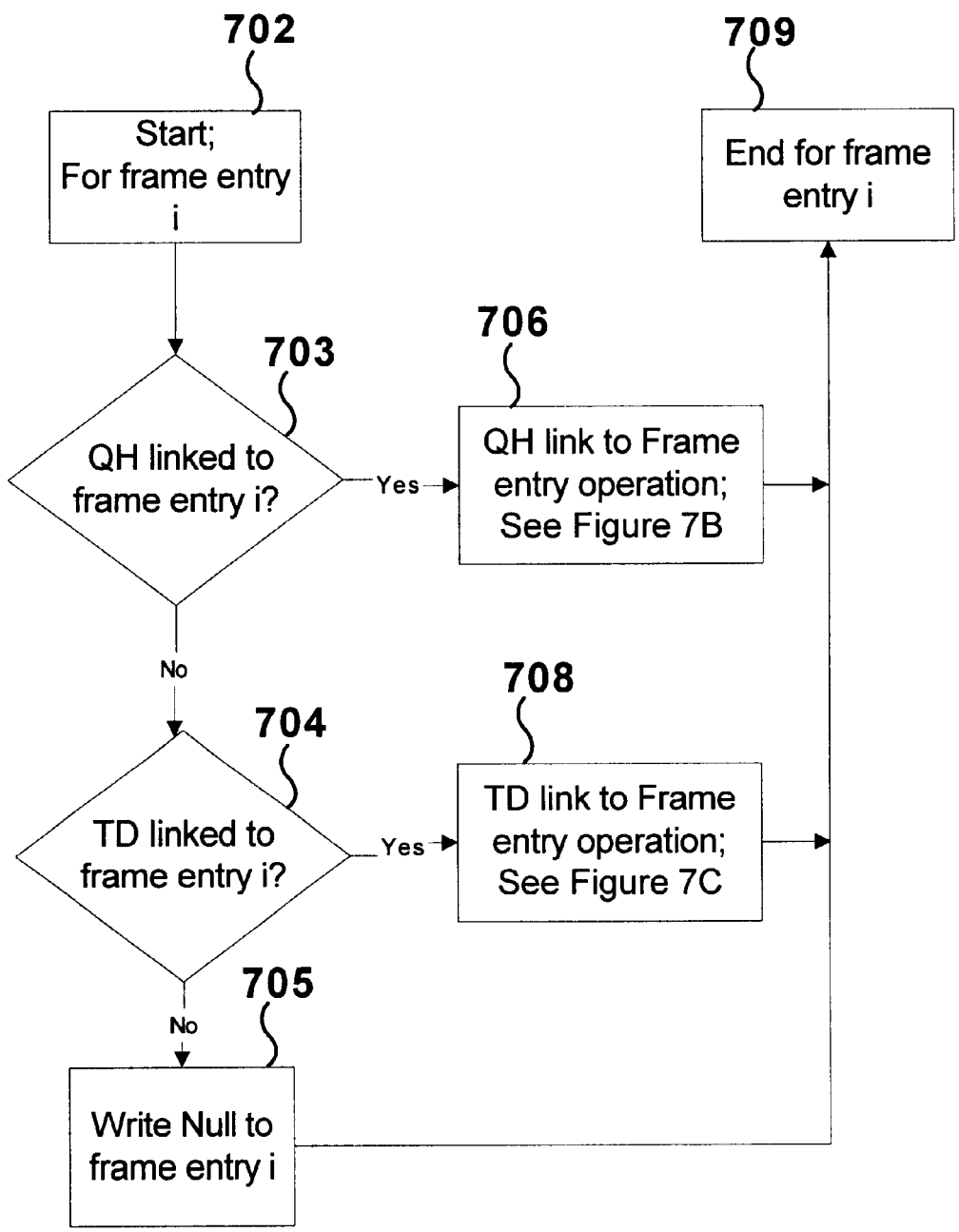

Referring to FIG. 7A, if in 703, a queuehead code structure is to be directly linked to frame entry i, then the code construction routine performs the operations of 706 as shown in FIG. 7B. If a TD code structure is to be directly linked to frame entry i, then the code construction routine performs the operations of 708 as shown. in FIG. 7C. If no code structure is to be directly linked to frame entry i, then a null value is written in frame entry i in operation 705.

FIG. 7B shows the operations of operation 706 from FIG. 7A for linking transaction code structures to a frame entry via a queuehead code structure. In 720, the code construction routine finds the next available 4 bytes of space in queuehead memory portion 307 for queuehead code structure X (QHx) and writes the address of that location to frame entry i. If at 721 a transfer descriptor code structure (TD) is to be linked to QHx, the code construction routine performs the TD-to-QH linkage operations of FIG. 7D. If no at 721, then a null value is written in the TD pointer field (e.g., 405) of QHx.

If in 724 a queuehead code structure is to be linked to QHx, in 725, the code construction routine finds the next available 4 bytes of space in queuehead memory portion 307 (the next four bytes after the space reserved for QHx) for a queuehead code structure Y (QHy) and writes the address of that location in the QH pointer field (e.g., 403) of QHx. If a transfer descriptor code structure (TD) is to be linked to QHy, then the code construction routine performs the TD to QH linkage operations of FIG. 7D. If no at 726, then a null value is written in the TD pointer field (e.g., 405) of QHy at 728.

If at 729, a queuehead code structure is to be linked to QHy, the code construction routine repeats operations 725 though to 729 until no more queuehead code structures are to be linked together, wherein the code construction routine writes a null value to the QH pointer field (e.g., 403) of the last queuehead code structure. An example multiple queuehead code structures being linked together is described in the discussions of the hub status endpoint transactions (see 607) where eight queuehead code structures are linked to a frame entry. Because with the hub status endpoint transactions each queuehead code structure points to a transfer descriptor code structure that is addressed to a different hub, the code construction routine keeps track of which queuehead code structure is being built so as to increment the hub address written to the command token field (e.g., 414) of the transfer descriptor code structure linked to that queuehead. For example, the first time the TD to QH operations (shown in FIG. 7D) are performed at 722, a hub address of "0" is written to the command token field (e.g., 414) of the TD code structure linked to QHx. However, the next time the TD-to-QH operations are performed (at 727), a hub address of "1" is written to the command token field (e.g., 414) of the TD code structure linked to the first QHy. Each time afterwards the TD-to-QH operations are performed at 727, the hub address is incremented to point the TD code structure to a different hub.

Figure 7C:
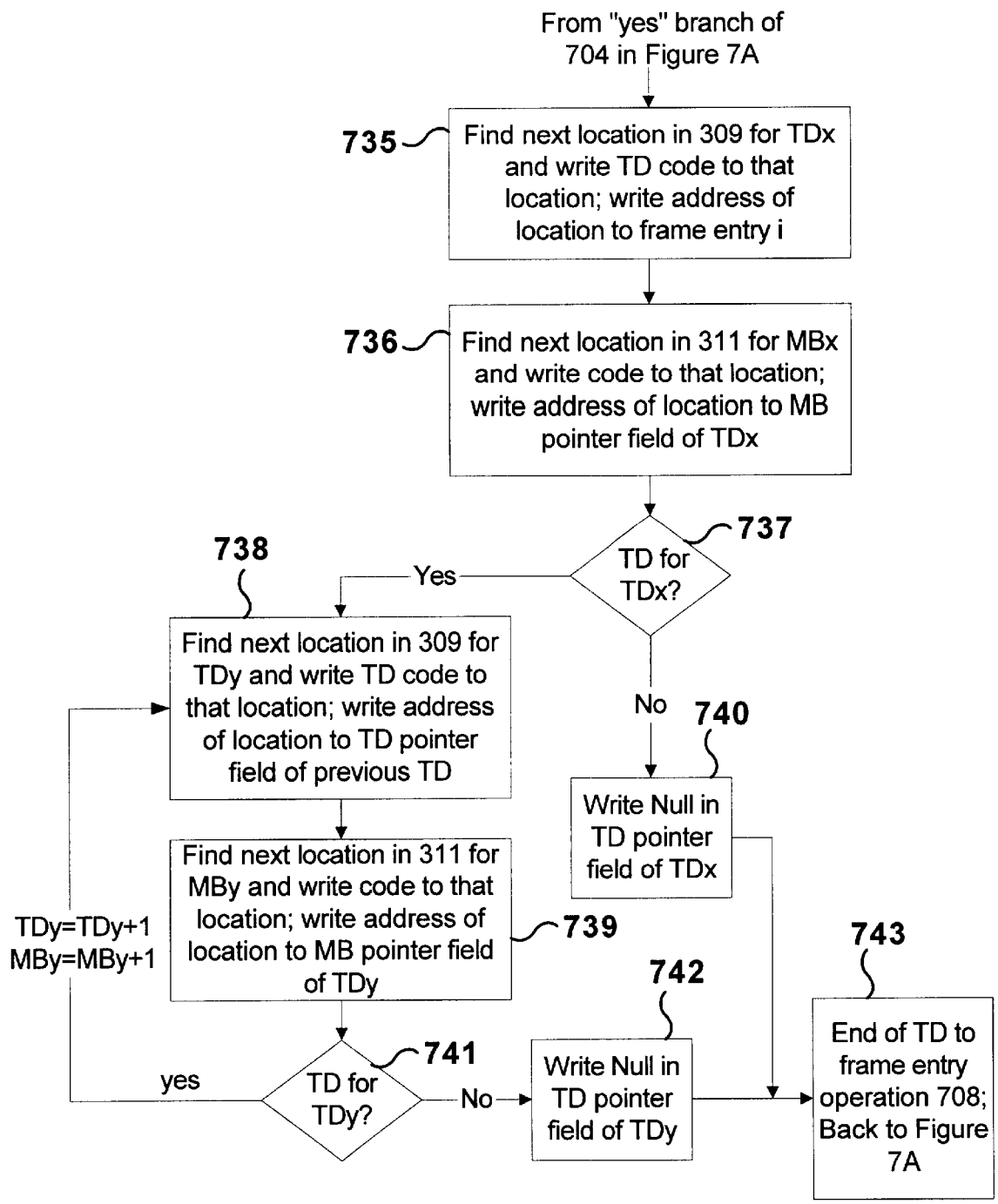

FIG. 7C shows the operations of operation 708 from FIG. 7A for linking transaction code structures to a framelist entry via a transfer descriptor code structure. In 735, the code construction routine finds the next available 16 bytes of space in transfer descriptor memory portion 309 for a transfer descriptor code structure X (TDx) and writes the address of that location to frame entry i. Also in 735, the code construction routine writes the appropriate transfer descriptor code structure template to the location in memory portion 309 reserved for TDx and makes the appropriate modifications to the fields of the written TD code structure. In 736, the code construction routine finds the next available space required for memory buffer X (MBx) in memory buffer portion 311 and writes the address of that location to the memory buffer pointer field (e.g., 415) of TDx. Also in 736, the code construction routine writes the appropriate code to the location in memory portion 311 reserved for MBx. The space required for a memory buffer may vary from 1 to 1023 bytes.

If at 737 a transfer descriptor code structure is to be linked to TDx, in 738, the code construction routine finds the next available 16 bytes of space in transfer descriptor memory portion 309 (the next 16 bytes after the space reserved for TDx) for a transfer descriptor code structure Y (TDy) and writes the address of that location in the TD pointer field (e.g., 412) of TDx. Also in 738, the code construction routine writes the appropriate transfer descriptor code structure template to the location in memory portion 309 reserved for TDy and makes the appropriate modifications to the fields of the written TD code structure. In 739, the code construction routine finds the next available space required for memory buffer Y (MBy) in memory buffer portion 311 and writes the address of that location to the memory buffer pointer field (e.g., 415) of TDy. Also in 739, the code construction routine writes the appropriate code to the location in memory portion 311 reserved for MBy.

If at 741, a TD code structure is to be linked to TDy, the code construction routine repeats operations 738 and 739 until no more TD code structures are to be linked together, wherein the code construction routine writes a null value to the TD pointer field (e.g., 412) of the last TDy code structure at 742. If no at 737, then the code construction routine writes a null value to the TD pointer field (e.g., 412) of the TDx at 740.

In those situations where multiple TD code structures are linked together, the code construction routine keeps track of which routine is being written in order to increment values written to fields of the TD code structures and/or to write the appropriate TD code structure template and make the proper modifications there to.

Figure 7D:
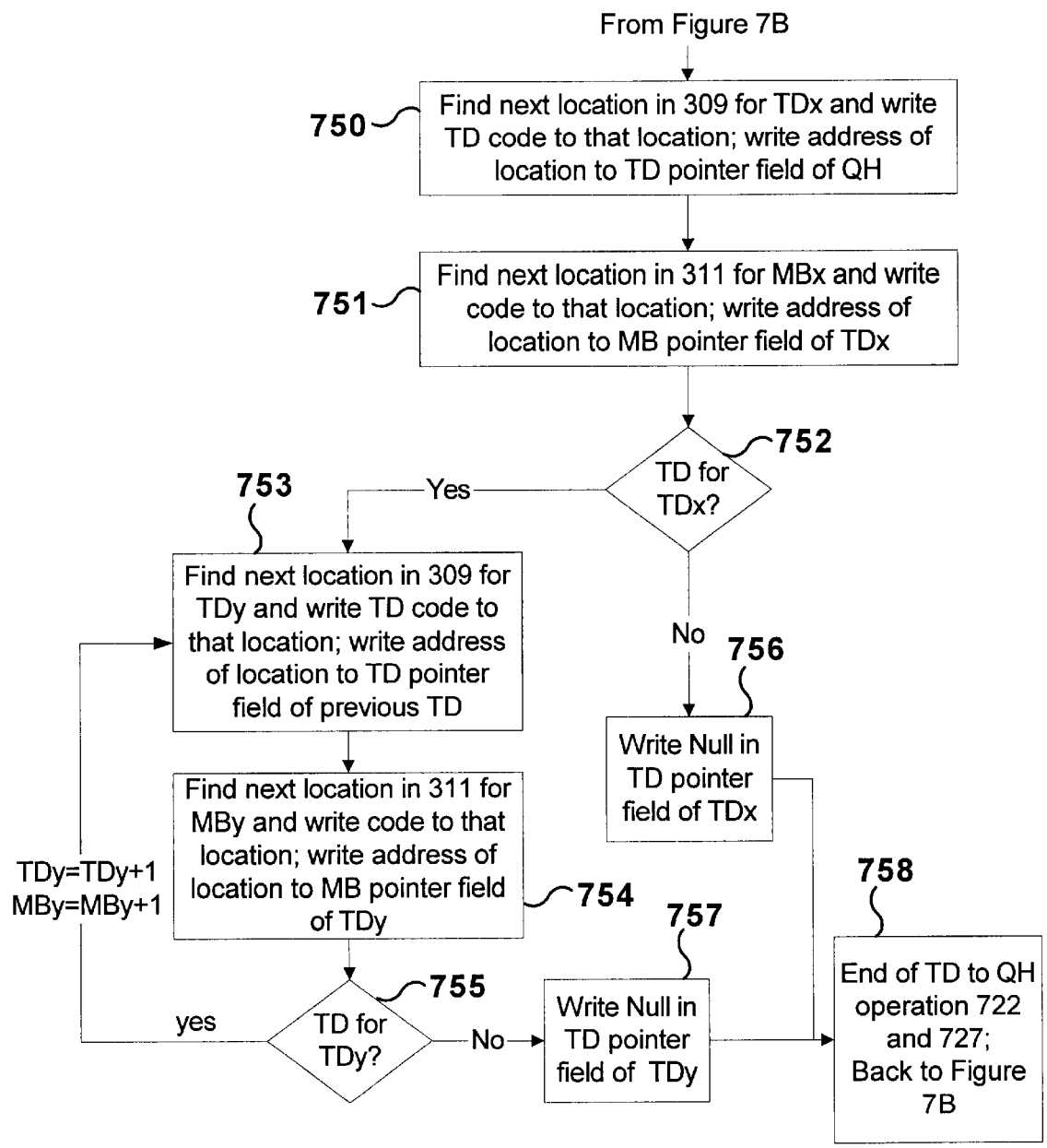

FIG. 7D shows the operations for linking transaction code structures to a queuehead code structure via a transfer descriptor code structure (referred to as TD-to-QH operations). In 750, the code construction routine finds the next available 16 bytes of space in transfer descriptor memory portion 309 for a transfer descriptor code structure X (TDx) and writes the address of that location to the TD pointer field (e.g., 405) of the queuehead structure to be linked to TDx. Also in 750, the code construction routine writes the appropriate transfer descriptor code structure template to the location in memory portion 309 reserved for TDx and makes the appropriate modifications to the fields of the written TD code structure. In 751, the code construction routine finds the next available space required for memory buffer X (MBx) in memory buffer portion 311 and writes the address of that location to the memory buffer pointer field (e.g., 415) of TDx. Also in 751, the code construction routine writes the appropriate code to the location in memory portion 311 reserved for MBx.

If at 752 a transfer descriptor code structure is to be linked to TDx, in 753, the code construction routine finds the next available 16 bytes of space in transfer descriptor memory portion 309 (the next 16 bytes after the space reserved for TDx) for a transfer descriptor code structure Y (TDy) and writes the address of that location in the TD pointer field (e.g., 412) of TDx. Also in 753, the code construction routine writes the appropriate transfer descriptor code structure template to the location in memory portion 309 reserved for TDy and makes the appropriate modifications to the fields of the written TD code structure. In 754, the code construction routine finds the next available space required for memory buffer Y (MBy) in memory buffer portion 311 and writes the address of that location to the memory buffer pointer field (e.g., 415) of TDy. Also in 754, the code construction routine writes the appropriate code to the location in memory portion 311 reserved for MBy.

If at 755, a TD code structure is to be linked to TDy, the code construction routine repeats operations 753 and 754 until no more TD code structures are to be linked together, wherein the code construction routine writes a null value to the TD pointer field (e.g., 412) of the last TDy code structure at 757. If no at 752, then the code construction routine writes a null value to the TD pointer field (e.g., 412) of the TDx at 756. The TD-to-QH operations end at 758.

An example of a transaction that includes multiple TD codes structures linked together is the get interface descriptor transactions (see discussion of 614).

In some embodiments, the code construction routine operations of FIGS. 6A–6B and FIGS. 7A–7D may be utilized in constructing USB operating code in a portion of system memory that is managed by the operating system.

Referring back to FIG. 1, computer system 101 includes a number of computer busses conforming to various computer bus standards that enable system processor 103 to be operably coupled to multiple computer devices. Computer bus 123 is a 32 bit computer bus conforming to a Peripheral Component Interface (PCI) Local Bus Specification, such as, e.g., the PCI Local Bus Specification, Rev. 2.2. Located on PCI computer bus 123 are PCI card slot connectors 125. Computer bus 123 is operably coupled to system processor 103 via I/O controller hub 115. Computer system 101 also includes a secondary 32 bit PCI computer bus 127 operably coupled to computer bus 123 via a PCI-to-PCI bridge 129 with 32 bit PCI card slots 131 located on secondary bus 127. A number of computer PCI compliant devices may be operably coupled to PCI busses 123 and 127 including devices (not shown) located on computer cards inserted into card slot connectors 125 and 131. Such devices include e.g., remote access circuits such as LAN connector circuits and modem circuits and sound card circuits (none shown). Computer system 101 also includes computer bus 151 which conforms to the Low Pin Count (LPC) bus standard. LPC computer bus 151 is operably coupled to computer system 101 via I/O controller hub 115. A non volatile memory BIOS ROM 121 is located on LPC bus 151. BIOS ROM 121 stores BIOS code including the code for building the USB operating code in system memory 107. Computer system 101 also includes a computer bus 171 conforming to the Integrated Drive Electronics (IDE) standard. A hard disk drive 181 is located on the IDE bus 171. Hard disk drive 181 stores application and operating system code. A video controller 110 conforming to the Advanced Graphics Port Specification (AGP video controller) is mounted on a computer card (not shown) that is inserted into an AGP card slot connector 111 which is operably coupled to memory control hub 105 via AGP bus 112. Other conventional computer devices (not shown) may be coupled via the computer busses and may be located either on computer cards or mounted to a system board of computer system 101.

Those of skill in the art will recognize that, based upon the teachings herein, several modifications may be made to the embodiments shown in FIGS. 1–7D. For example, other types, forms, versions, and or configurations of computer systems may include a non operating system managed, extended portion of system memory reserved for USB operating code and/or include code for constructing USB operating code in system memory. Also, in other embodiments, operating code for bus controllers of computer buses conforming to other computer bus standards may be stored in non operating system managed, extended portions of system memory and/or may be constructed in system memory from a code construction routine.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A computer system comprising:

a system processor;

a system memory operably coupled to the system processor;

a computer bus operably coupled to the system processor;

a computer bus controller for the computer bus;

wherein during an operation of the computer system, operating code for the computer bus controller is stored in an extended portion of the system memory that is non operating system managed.

2. The computer system of claim 1 wherein the computer bus substantially conforms to a Universal Serial Bus (USB) standard.

3. The computer system of claim 1 wherein the computer bus controller operates asynchronously from the system processor during an operation of the computer system.

4. The computer system of claim 1 wherein the operating code stored in the extended portion of system memory that is non operating system managed includes transaction code.

5. The computer system of claim 1 wherein the operating code stored in the extended portion of system memory that is non operating system managed includes a transaction code pointer list.

6. The computer system of claim 1 wherein the operating code stored in the extended portion of the system memory that is non operating system managed is stored in a portion of the system memory that is operating system hidden.

7. The computer system of claim 6 wherein the portion of the system memory is operating system hidden is located above a portion of system memory reported to an operating system during an operation of the computer system.

8. The computer system of claim 1 wherein the operating code stored in the extended portion of the system memory that is non operating system managed is stored in a portion of the system memory that is reported to an operating system during an operation of the computer system as reserved.

9. The computer system of claim 1 further comprising:

a non volatile memory storing code whose execution by the system processor during a startup of the computer system writes the operating code to the extended portion of the system memory that is non operating system managed.

10. The computer system of claim 1 wherein the computer bus controller is implemented in an I/O controller hub.

11. The computer system of claim 1 wherein the operating code occupies at least 8 K bytes of the system memory.

12. A computer system comprising:

a system processor;

a system memory operably coupled to the system processor;

a computer bus operably coupled to the system processor;

a computer bus controller for the computer bus;

a non volatile memory, the non volatile memory storing code whose execution by the system processor writes operating code for the computer bus controller to an extended portion of the system memory that is non operating system managed.

13. The computer system of claim 12 wherein the computer bus substantially conforms to a Universal Serial Bus (USB) standard.

14. The computer system of claim 12 wherein the computer bus controller operates asynchronously from the system processor during an operation of the computer system.

15. The computer system of claim 12 wherein the operating code written to the extended portion of the system memory that is non operating system managed includes transaction code.

16. The computer system of claim 12 wherein the operating code written to the extended portion of the system memory that is non operating system managed includes a transaction code pointer list.

17. The computer system of claim 12 wherein the operating code written to the extended portion of the system memory that is non operating system managed is written to a portion of the system memory that is operating system hidden.

18. The computer system of claim 17 wherein the operating code written to the extended portion of the system memory that is non operating system managed is written to a location above a portion of system memory reported to the operating system during an operation of the computer system.

19. The computer system of claim 12 wherein the operating code written to the extended portion of the system memory that is non operating system managed is written to a portion of the system memory that is reported to the operating system during an operation of the computer system as reserved.

20. The computer system of claim 12 wherein the nonvolatile memory stores BIOS code, wherein the code executed by the system processor is implemented in the BIOS code.

21. The computer system of claim 12 wherein the code is executed by the system processor during a startup of the computer system to write the operating code for the computer bus controller to an extended portion of the system memory that is non operating system managed.

22. A method for providing code to a computer bus controller comprising:
   writing to a non operating system managed, extended portion of a system memory operating code for a computer bus controller;
   executing at least a portion of the operating code by the computer bus controller.

23. The method of claim 22 wherein the writing further includes building a framelist in the non operating system managed, extended portion.

24. The method of claim 22 wherein the writing further includes building transaction code in the non operating system managed, extended portion.

25. The method of claim 22 wherein the writing further includes executing BIOS code by a system processor to write the operating code to the non operating system managed, extended portion.

26. The method of claim 22 wherein the computer bus substantially conforms to a Universal Serial Bus (USB) standard.

27. The method of claim 22 wherein the computer bus controller operates asynchronously from the system processor during an operation of the computer system.

28. The method of claim 22 wherein the operating code written to the non operating system managed, extended portion of system memory includes transaction code.

29. The method of claim 22 wherein the writing further includes:
   writing transaction code for every supported transaction on the computer bus to the non operating system managed, extended portion.

* * * * *